July 8, 1958     E. J. BRADBURY     2,842,218
MOTOR VEHICLE TAIL PIPE SUPPORT MEANS
Filed Nov. 14, 1955
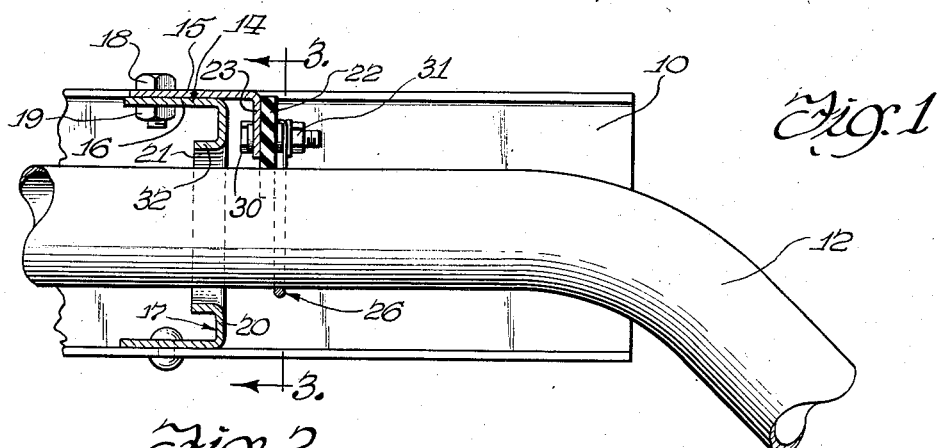
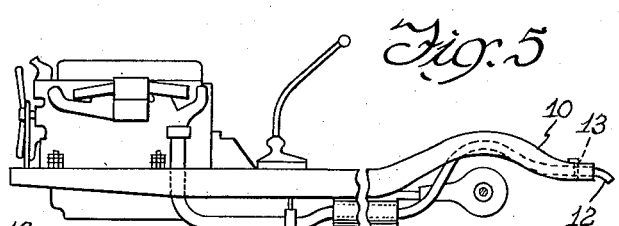
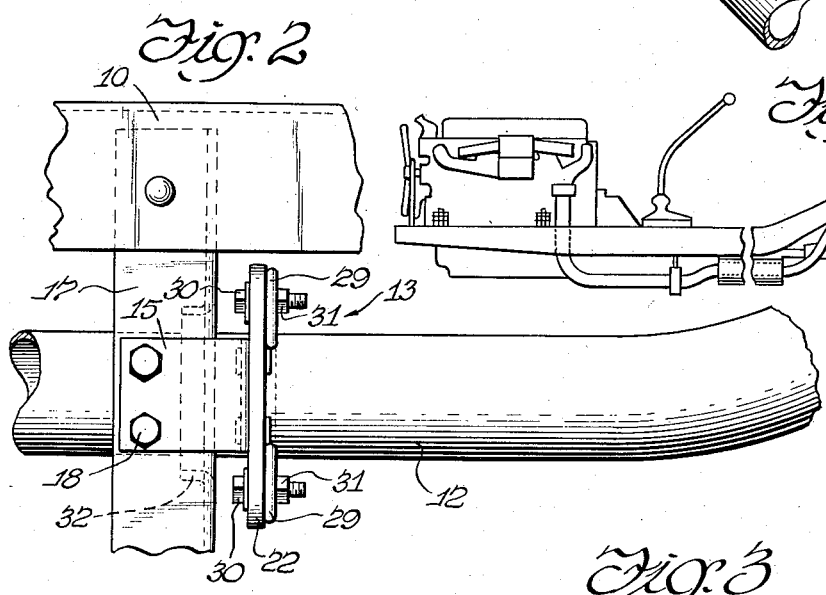
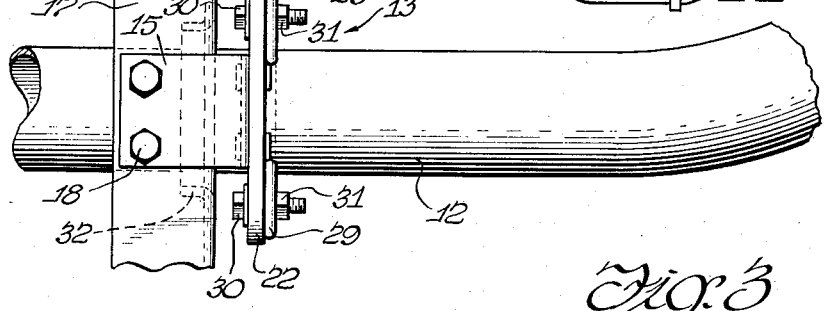
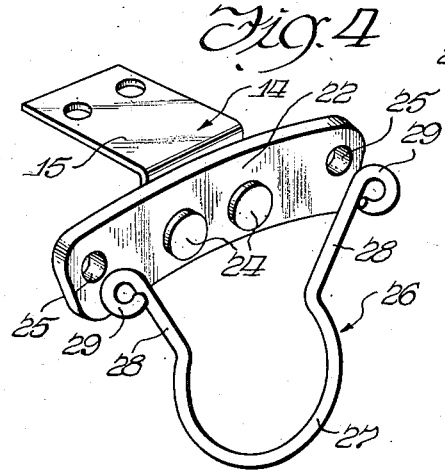
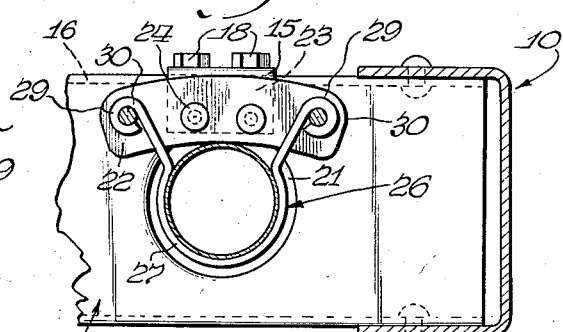
Inventor
Edgar John Bradbury
Paul O. Pippel
Attorney

United States Patent Office 2,842,218
Patented July 8, 1958

2,842,218

MOTOR VEHICLE TAIL PIPE SUPPORT MEANS

Edgar John Bradbury, Albion, Ind., assignor to International Harvester Company, a corporation of New Jersey Application November 14, 1955, Serial No. 546,682

3 Claims. (Cl. 180—64)

This invention relates to supporting means for pipes and the like and more particularly to a unique economical means for supporting pipes which are subjected to horizontal and vertical forces in use tending to move the same relatively to the relatively stationary structures such as motor vehicle exhaust tail pipe assemblies.

Because of the unbalance of moving parts unequal power impulses, combustion roughness and engine torque reactions reciprocating piston-type motor vehicle internal combustion engines are subjected to vibratory forces tending to oscillate the engine when operating. Thus in most installations the engine is mounted on the vehicle chassis frame in such a manner that it is free to oscillate relatively to the frame in all directions to prevent the transmission of such vibratory forces to the chassis frame. The mounting means employed generally offer a resilient strain against excessive relative movement between the chassis frame and the engine and cushion the vibratory forces. An exhaust pipe which includes a muffler extends from the engine to a point where it is desirous of expelling exhaust gases to the atmosphere and since the exhaust pipe is rigidly connected to the exhaust manifold of the engine, it is obvious that the oscillating movement of the engine is transmitted to the exhaust pipe tending to move it relatively to the frame. Furthermore, the exhaust pipe is periodically heated and cooled as when the engine is in operation and when stopped. Thus the exhaust pipe tends to expand and contract longitudinally in accordance with such changes of temperature with respect to the chassis frame. Difficulty has also been experienced in the past in providing supporting means for the exhaust pipe of a motor vehicle which will function to insulate the exhaust pipe so that the exhaust noises therein will not be transmitted to the vehicle frame. It is therefore an important object of the present invention to provide a relatively simple and inexpensive but sturdy supporting means for a motor vehicle exhaust pipe which will positively secure the exhaust pipe in assembled relation with respect to the frame but will permit the exhaust pipe to move longitudinally with respect to the frame to compensate for changes in temperature thereof and to a limited degree in a transverse direction to permit relatively free movement of the exhaust pipe with respect to the frame due to oscillation of the engine when operating. The supporting means of the present invention also allows the exhaust pipe to move vertically to cushion road shocks which might otherwise cause the mounting parts interconnecting the exhaust pipe and the chassis frame to fail and break if subjected to repeated stresses during the operation of the vehicle to thus materially shorten the operating life of the mounting or supporting structure.

Another object of the invention is to provide means for connecting the exhaust gas pipe to the chassis frame which connections are effective to insulate the exhaust gas pipe from metal-to-metal contact with the frame whereby the noises developed within the exhaust gas pipe are prevented from being transmitted to the frame.

Another object of the present invention is to provide an improved flexible mounting for the exhaust gas pipe of a resiliently mounted vehicle engine which permits the exhaust gas pipe communicating therewith to move freely in unison with the engine with respect to the chassis frame.

A still further object is the provision of a flexible supporting means for a motor vehicle exhaust gas pipe which will flex sufficiently to permit the exhaust gas pipe to move longitudinally with respect to the chassis frame upon changes in temperature thereof as well as to permit limited flexibility in transverse and horizontal directions whereby the engine and exhaust gas pipe can oscillate with respect to the chassis frame which means also acts as a sound insulator whereby the exhaust noises developed within the exhaust gas pipe are not transmitted to the chassis frame.

Still another object is to provide unique and novel means for mounting the exhaust gas pipe upon the vehicle frame which means supports sufficient flexibility in all directions to permit relatively free displacement of exhaust gas pipe with respect to the frame at the same time positively connecting the exhaust gas pipe to the vehicle.

A further object is to provide a novel auxiliary support means for a vehicle tail pipe which will insure against accidental disengagement of the tail pipe from the frame even though the main or primary flexible support means should fail.

The foregoing and other important objects and desirable features inherent in and encompassed by the invention together with many of the purposes and uses thereof will become readily apparent from a reading of the ensuing description in conjunction with the annexed drawings, in which:

Figure 1 is a fragmentary side elevational view of a side sill member of a motor vehicle chassis frame;

Figure 2 is a plan view of the rear portion of a chassis frame;

Figure 3 is a sectional view taken substantially along line 3—3 of Figure 1;

Figure 4 is a perspective view of various components of the support hanger; and

Figure 5 is a side elevational view of a motor vehicle chassis frame showing the exhaust gas pipe extending from the engine to the rearwardmost end of the chassis frame.

Referring to the drawings in detail, wherein like reference characters represent like elements throughout the various views, there is shown the extreme rearward portion of one of a pair of transversely spaced longitudinal side sill members 10 of a motor vehicle chassis frame. Disposed generally below the tops of the side sill members 10 is an engine exhaust assembly which includes a sound absorbing muffler or silencer operatively connected at its rear or discharge end to a tail pipe 12. A forward or inlet end of the muffler is similarly operatively connected to one end of a manifold exhaust pipe which has its opposite end rigidly connected to the engine exhaust manifold.

The vehicle power plant or engine is supported on the vehicle chassis frame in a conventional manner wherein limited oscillating or rocking movement of the engine with respect to the side sill members 10 is permitted to compensate for the vibratory forces developed by the engine when operated. It will be appreciated that since the exhaust assembly is rigidly connected to the engine the rocking movement of the engine is imparted thereto. Furthermore, the exhaust assembly is subjected to the heat of the exhaust gases flowing therethrough as well as atmospheric conditions and, as a result, either elongates or contracts with respect to the chassis frame. The mounting means to be described hereinafter in detail is primarily concerned with the supporting structure for the extreme rearward end of the exhaust gas pipe assembly which is commonly known as the vehicle tail pipe and is designed to permit relatively unrestrained displacement of the tail pipe 12 in a transverse direction with respect to the chassis frame to compensate for the rocking movement of the engine as well as lengthening and shortening of the assembly in a longitudinal direction with respect to the chassis frame to accommodate elongation or retraction due to the differences in temperature in the chassis frame and the exhaust gas assembly without subjecting the assembly to damaging stresses and strains.

The support hanger, designated generally by numeral 13, is employed to interconnected chassis frame and the tail pipe 12 and is adapted to suspend the tail pipe 12 from the side sill members 10 and maintain the same in an operative position. The support hanger 13 is designed to accommodate the aforementioned relative movement between the exhaust assembly 11 and the side sill members 10. In the embodiment of the invention shown in the drawings the support hanger 13 includes an L-shaped bracket 14 which has one leg 15 thereof rigidly fastened to the top flange 16 of a transversely extending cross member 17 interconnecting the transversely spaced side sill members 10 by means of suitable bolts and nuts 18 and 19, respectively. The web 20 of the cross member 17 is provided with a circular opening 21, defined by an annular, longitudinally extending flange 32 through which the tail pipe 12 extends. It will be noted that the exterior surface of the tail pipe 12 is spaced radially from the flange 32 when the tail pipe is assembled on the chassis frame. The central section of a bar 22 is rigidly fastened to the depending leg 23 of the bracket 14 by means of a pair of rivets 24. The bar 22 is provided with an aperture 25 adjacent each of its transverse ends. The bar 22 is made of a non-metallic material such as rubber, rubber composition or the like and is somewhat resilient and flexible.

A wire rod, designated generally by numeral 26, of a suitable length and gauge has its central section in the form of a semi-loop 27 opened at its upper side. The semi-loop has a diameter corresponding to the diameter of the tail pipe 12. Integrally formed with each end of the semi-loop 27 is an upwardly extending relatively straight arm 28. The arms 28 extend divergingly from the opened loop 27 and lie in substantially the same vertical transverse plane containing the semi-loop 27. The free end of each arm 28 is in the form of an eye 29. The wire rod 26 is detachably secured to the bar 22 by means of bolts 30 extending through the apertures 25 and the eyes 29 and cooperable lock nuts 31. The wire rod 26 employed is preferably of steel possessing rigidity and resiliency and consequently when the eyes 29 are secured to the bar 22 a small amount of force is required for flexing the arms 28 toward each other since the spacing between the eyes 29 is greater when the wire rod 26 is in its unassembled or relaxed state than the spacing between the apertures 25. Thus the semi-loop 27 firmly and constantly grips substantially two-thirds of the circumference of the tail pipe 12 to prevent slipping and rattling of the engaging parts. It will also be appreciated that inasmuch as the bar 22 is made of rubber or other non-metallic material having like physical properties universal relative movement between the tail pipe 12 and the chassis frame 12 is permitted by flexing of the ends of the bar 22. Furthermore, noises caused by vibrations and the exhaust gases flowing through the exhaust gas assembly are absorbed by the bar 22 and are not transferred to the chassis frame. It will also be apparent that the support hanger 13 described above permits the tail pipe 12 to be readily detached from the chassis frame merely by unthreading the two lock nuts 31. Furthermore, inasmuch as the tail pipe 12 extends through the cross member 17, it is impossible for the tail pipe 12 to become disengaged from the chassis frame in the event that the support hanger 13 should fail in use since the tail pipe 12 then will be supported directly by the cross member 17.

From the foregoing it will be appreciated that the support hanger provides an improved means for mounting a tail pipe upon a chassis frame which allows the tail pipe to move freely longitudinally, transversely and vertically of the vehicle but which affords the stability to withstand the severe uses to which such a tail pipe is exposed.

The embodiment of the invention chosen for the purposes of description and illustration herein is that preferred for achieving the objects of the invention and developing the utility thereof in a most desirable manner due regard being had to existing factors of economy, simplicity of design and construction, production methods and improvements sought to be effected. It will be appreciated therefore that the particular structural and functional aspects emphasized herein are not intended to exclude but rather to suggest such other modifications and adaptations of the invention as fall within the spirit of the scope of the invention as defined in the appended claims.

What is claimed is:

1. In a motor vehicle having an engine mounted upon a longitudinal frame for oscillatory movement, said chassis frame including a pair of transversely spaced side sill members inter-connected by a transversely extending cross member having an opening therein, the combination including said chassis frame of an engine exhaust assembly comprising a cylindrical longitudinally extending tail pipe, said tail pipe extending through said opening and being radially spaced from the cross member portion defining said opening; and means for connecting said tail pipe to said chassis frame including a single L-shaped bracket having a horizontally disposed leg secured to said cross member above said opening and a substantially vertical, downwardly depending leg longitudinally spaced from said cross member, a single transversely extending, flexible and resilient bar of non-metallic material having its center section secured to said depending leg and its ends transversely spaced from and on respective opposite sides of said depending leg, a single continuous length of relatively stiff wire rod disposed in a vertical plane, said wire rod having its ends in the form of eyes and arms extending downwardly from said eyes in relatively converging relation to a jointure portion at the lower ends thereof, said jointure portion being in the form of a loop open at its upper side for receiving and encircling substantially two-thirds of the circumference of said tail pipe, and means for quick detachably securing each eye to a respective end portion of said bar whereby said loop firmly grips said tail pipe.

2. In a motor vehicle having an engine mounted upon a longitudinal frame for oscillatory movement, said chassis frame including a pair of transversely spaced side sill members inter-connected by a transversely extending cross member having an opening therein, the combination including said chassis frame of an engine exhaust assembly comprising a cylindrical longitudinally extending tail pipe, said tail pipe extending through said opening and being radially spaced from the cross member portion defining said opening; and means for connecting said tail pipe to said chassis frame including a single L-shaped bracket having a horizontally disposed leg secured to said cross member above said opening and a vertical, downwardly depending leg longitudinally spaced from said cross member, a single transversely extending rubber bar having its center section secured to said depending leg and its ends transversely spaced from and on respective opposite sides of said depending leg, a single length of relatively stiff resilient wire rod disposed in a vertical plane, said wire rod having its ends in the form of eyes and an intermediate semi-loop forming substantially two-thirds of a circle for receiving said tail pipe, said semi-loop normally tending to resist approach of said eyes toward each other, and means for quick detachably securing each eye to respective end of said bar whereby said semi-loop firmly grips said tail pipe, the spacing of said eyes when detached from said bar being greater than the spacing of said eyes when attached to said bar.

3. In a motor vehicle having an engine mounted upon a longitudinal frame for oscillatory movement, said chassis frame including a pair of transversely spaced side sill members inter-connected by a transversely extending cross member having an opening therein, the combination including said chassis frame of an engine exhaust assembly comprising a cylindrical longitudinally extending tail pipe, said tail pipe extending through said opening and being radially spaced from the cross member portion defining said opening; and means for connecting said tail pipe to said chassis frame including a single transversely extending flexible and resilient bar of non-metallic material having its center section supported by said cross member adjacent to and above said opening, a single length of relatively stiff resilient wire rod disposed in a vertical plane, said wire rod having its ends in the forms of eyes and arms extending downwardly from said eyes in relatively converging relation to a jointure portion at the lower ends thereof, said jointure portion being in the form of a loop open at its upper side for receiving said tail pipe, and means for quick detachably connecting said eyes to respective transversely spaced end portions of said bar whereby substantially two-thirds of the circumference of said tail pipe is firmly gripped by said jointure portion.

References Cited in the file of this patent

UNITED STATES PATENTS

| | | |
|---|---|---|
| 591,249 | Emery | Oct. 5, 1897 |
| 2,162,340 | Peterman | June 13, 1939 |
| 2,290,621 | Riesing | July 21, 1942 |
| 2,308,969 | Riesing | Jan. 19, 1943 |
| 2,324,992 | Riesing | July 20, 1943 |
| 2,547,813 | Zoons et al. | Apr. 3, 1951 |
| 2,618,450 | Thomas | Nov. 18, 1952 |
| 2,687,864 | Kohler | Aug. 31, 1954 |

FOREIGN PATENTS

| | | |
|---|---|---|
| 17,993 | Great Britain | Sept. 26, 1895 |